United States Patent
Zurn et al.

(10) Patent No.: US 10,102,511 B2
(45) Date of Patent: *Oct. 16, 2018

(54) SYSTEMS AND METHODS FOR EMERGENCY MONEY TRANSFER TRANSACTIONS

(71) Applicant: Moneygram International, Inc., Minneapolis, MN (US)

(72) Inventors: Raymond Zurn, Fridley, MN (US); Emelyn Varness, Coon Rapids, MN (US); Mindy Prawer Bruns, Dallas, TX (US); Lisa Marie Minogue, Forest Lake, MN (US); Leslie Korsh, Minnetonka, MN (US); Douglas Porter, Edina, MN (US)

(73) Assignee: Moneygram International, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,428

(22) Filed: Mar. 7, 2017

(65) Prior Publication Data

US 2017/0178096 A1 Jun. 22, 2017

Related U.S. Application Data

(63) Continuation of application No. 13/539,611, filed on Jul. 2, 2012, now Pat. No. 9,619,790.

(51) Int. Cl.
*G06Q 20/10* (2012.01)
*G06Q 20/20* (2012.01)

(52) U.S. Cl.
CPC ............. *G06Q 20/10* (2013.01); *G06Q 20/20* (2013.01)

(58) Field of Classification Search
CPC ........ G06Q 20/10; G06Q 20/20; G06Q 40/02; G06Q 40/06
USPC ...... 705/16, 21, 30, 38–40, 42, 44; 235/379, 235/380; 709/225–226
See application file for complete search history.

(56) References Cited

U.S. PATENT DOCUMENTS

| | | |
|---|---|---|
| 5,453,601 A | 9/1995 | Rosen |
| 7,182,252 B1 | 2/2007 | Cooper et al. |
| 8,424,750 B2 | 4/2013 | Grovit |
| 2002/0082984 A1 | 6/2002 | Zappier |
| 2003/0080185 A1 | 5/2003 | Werther |
| 2007/0255653 A1 | 11/2007 | Tumminaro et al. |
| 2009/0119190 A1 | 5/2009 | Realini |
| 2010/0125532 A1 | 5/2010 | Cohen et al. |
| 2010/0125533 A1 | 5/2010 | Hoffmann et al. |
| 2011/0145139 A1 | 6/2011 | Valdes et al. |
| 2011/0155799 A1 | 6/2011 | Meszaros et al. |
| 2011/0251906 A1 | 10/2011 | Loevenguth et al. |
| 2012/0197707 A1 | 8/2012 | Cohagan et al. |
| 2012/0221422 A1 | 8/2012 | Sobek |

(Continued)

*Primary Examiner* — Vanel Frenel
(74) *Attorney, Agent, or Firm* — Norton Rose Fulbright US LLP

(57) ABSTRACT

Systems and methods which allow for a money transfer transaction to be funded without providing payment at the point in time when the transaction is originated and which also do not require a customer to undertake a separate transaction with a separate entity prior to initiating the money transfer transaction with a money transfer service are provided. Embodiments may therefore allow for money transfers, such as in emergency situations, when customers would not otherwise have payment readily available at the time of the transaction.

21 Claims, 3 Drawing Sheets

(56) References Cited

U.S. PATENT DOCUMENTS

2016/0048818 A1 2/2016 Tulluri et al.
2016/0117668 A1 4/2016 Pitroda et al.

SYSTEMS AND METHODS FOR EMERGENCY MONEY TRANSFER TRANSACTIONS

CROSS-REFERENCE TO RELATED APPLICATION

The present application is a continuation of U.S. patent application Ser. No. 13/539,611, filed Jul. 2, 2012 and entitled "SYSTEMS AND METHODS FOR EMERGENCY MONEY TRANSFER TRANSACTIONS," the disclosure of which is incorporated herein by reference in its entirety.

TECHNICAL FIELD

The present application relates to money transfer transactions, and more specifically to systems and methods for facilitating emergency money transfer transactions.

BACKGROUND

Generally speaking, money transfers are real-time transactions in that a transaction begins when a sender initiates the transaction at the time the money is to be sent to a receiving party. For example, a money transfer may be utilized in an emergency setting such as when a receiving party has an immediate need for funds. In such a transaction, a sender initiates a money transfer transaction with a money transfer service, such as with a local agent located within a MoneyGram® location. When the transaction information is gathered and the structure of the transaction is finalized, the sender provides the funds to a money transfer agent at or before the time that the funds of the transaction are actually transferred.

Once the funds are received at the time of the transaction, the agent may then provide a transaction code or some other form of transaction identifier to the sender. The sender will then provide the transaction code or identifier to the receiver. With this code the receiver may enter an agent location and complete the transaction and receive the transferred funds.

When dealing with money transfer transactions, many customers are among a category of people which can be considered "under banked." For example, many customers solely use cash for purchases, are unable to obtain credit, have poor credit ratings, etc. Because of this, a full range of payment options are typically not available to fund a money transfer request for many customers. As a result, in an emergency situation where such a customer needs to quickly send money to a recipient, the customer may not have the ability to fund the transaction at the point of the transaction origination, and therefore may be unable to provide the emergency funds. In such situations, the customer may be left with the only option of taking on additional transactions/obligations such as taking out a high interest payday loan.

BRIEF SUMMARY

The present application provides systems and methods which allow for a money transfer transaction to be funded without providing payment at the point in time when the transaction is originated and which also do not require a customer to undertake a separate transaction with a separate entity prior to initiating the money transfer transaction with a money transfer service. Embodiments therefore allow for emergency money transfers when customers would not otherwise have payment readily available at the time of the transaction.

In one embodiment, a money transfer service may utilize transaction reliability criteria based on history with a customer, loyalty program information, and the like, in order to make a determination to allow the transaction to proceed without immediate funding. In another embodiment a money transfer service may utilize a third party to provide reliability information in order to allow the transaction to proceed without funding, or to facilitate other means (e.g., funding by the third party) for allowing the transaction to proceed. Embodiments may also utilize a combination of these features.

In accordance with one embodiment, a method for facilitating a money transfer is provided. The method includes receiving transaction information from a sending party by a money transfer service. Additionally, transaction reliability data is reviewed to determine whether the sending party is eligible to establish the money transfer transaction. Further, the method includes sending funds to a receiving party pursuant to the money transfer transaction without receiving the funds from the sending party at the time of the transaction.

Another embodiment provides for a method for facilitating a money transfer transaction. The method includes initiating a money transfer transaction by a money transfer service. Transaction information regarding a sending party is obtained which may include information regarding the sending party, the transaction amount, and the receiving party. The method further includes determining whether payment for the money transfer transaction will be provided at the point-of-sale. In the event that payment will not be provided, reliability information may be reviewed for the transaction in order to determine whether to establish an unfunded money transfer transaction. Additionally, the method includes establishing a payment plan for the money transfer transaction.

In accordance with yet another embodiment, a method includes initiating an unfunded money transfer transaction. Upon such initiation, a determination is made by a money transfer service regarding whether to establish a payment plan to later fund the money transfer transaction. Upon a positive determination, the method establishes the unfunded transaction and payment plan. Further, the method executes the money transfer transaction prior to receiving payments from a sending party.

The foregoing has outlined rather broadly the features and technical advantages of the present invention in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of embodiments described herein, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present embodiments.

BRIEF DESCRIPTION OF THE DRAWINGS

For a more complete understanding, reference is now made to the following descriptions taken in conjunction with the accompanying drawings, in which.

DETAILED DESCRIPTION

Figure 1:
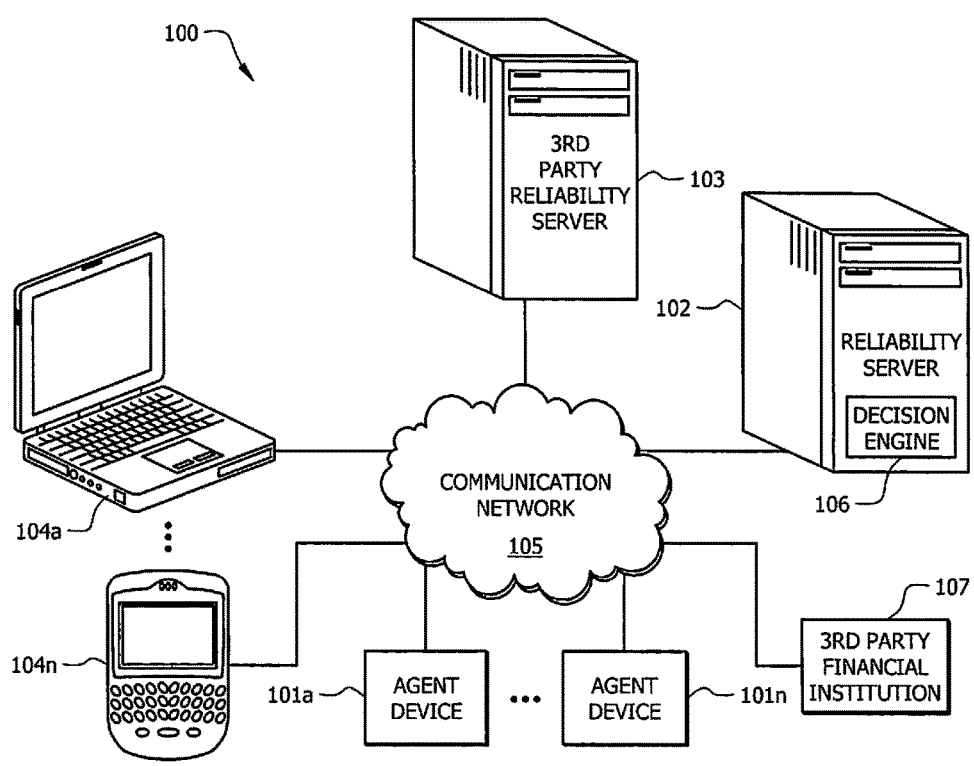
FIG. 1 illustrates a system for facilitating one or more money transfer transactions in accordance with an embodiment of the present application.

FIG. 1 illustrates a system 100 for facilitating one or more money transfer transactions in accordance with an embodiment of the present application. System 100 includes agent devices 101a-101n, transaction reliability information database 102, third party transaction reliability information database 103, and user devices 104a-104n, each in communication with others over communication network 105.

Communications between devices in system 100 may be facilitated in whole, or in part, by communication network 105. Communication network 105 may comprise the Internet, WiFi, mobile communications networks such as GSM, CDMA, 3G/4G, WiMax, LTE, and the like. Further, communications network 105 may comprise a combination of network types working collectively.

Agent devices 101a-101n may correspond to computer systems within a money transfer agent location. Agent devices 101a-101n could include special purpose computers programmed to implement steps described herein, or could be conventional processing devices configured to run software which facilitates the described money transfer transactions. For example, such devices may be computer systems which are accessible by an agent at an agent location, may be automated machines such as an Automated Teller Machine (ATM), and the like. Agent devices 101a-101n may be located throughout the world and one or more devices may be utilized within a single money transfer transaction. Agent devices 101a-101n are configured to send and receive information over communication network 105. In some embodiments, agent devices 101a-101n may also have a direct connection with transaction reliability information database 102. Agent devices 101a-101n may be configured to transmit transaction information between respective devices of system 100.

Transaction reliability information database 102 may be implemented as a computing device, as a network of computing devices, or in any manner that facilitates one or more of the storage, compilation and communication of reliability information within system 100. In some embodiments, transaction reliability information database 102 may be distributed among agent locations within agent devices 101a-101n. Transaction reliability information database 102 is configured to compile, store and provide transaction reliability information regarding a sending party in a money transfer transaction. Transaction reliability information may include information regarding the type of transfer being made, the previous transfer history of the sender, credit ratings, financial accounts or any other information pertinent to the reliability of the sending party. Transaction reliability information may be compiled using data received from agent devices regarding the user, the user's transaction history, etc.

It is noted that when taking into account the type of transfer being made, some embodiments may also utilize information regarding the intended recipient of transferred funds. For example, it may be notable in a money transfer transaction if the receiving party is a known family member or dependent of the sender. This information would be indicative of the transaction and sender being more reliable party as the sending party could be less prone to fail to provide payment for such transactions. As such, information regarding the transfer being made may include situational information surrounding the transaction.

Transaction reliability information database 102 may also include a transaction reliability decision engine 106. Transaction decision engine 106 may utilize information compiled by database 102 in order to make a determination as to whether a sender may be extended the courtesy of implementing a money transfer transaction prior to providing payment to a money transfer agent. Further, transaction decision engine 106 may pre-authorize a maximum amount of money which a sending party may send prior to providing such payment. Transaction decision engine 106 may also maintain an accounting of transactions sent by a sending party in order to determine whether payment has been made for previous transactions, and the like. As with transaction reliability information database 102, transaction decision engine 106 may also be part of a distributed network. Additionally, in some embodiments, transaction decision engine 106 may be implemented in whole or in part within agent devices 101a-101n.

In one embodiment, transaction decision engine 106 includes a customer loyalty database. Such a loyalty database may be utilized to maintain information regarding a customer that participates in a loyalty program. For example, customers that are part of a loyalty program may provide personal information to establish a loyalty account and subsequently tie that account to later money transfer activity. The knowledge of a customer's history/transfer activity, personal information regarding family or other close ties, etc., can be utilized as described above to make reliability determinations. Additionally, in some embodiments, points awarded as part of a loyalty program may be used to fund a money transfer transaction in whole or in part.

Transaction reliability information may be further compiled utilizing one or more services corresponding to third party transaction reliability database 103. Third party transaction reliability database 103 may correspond to services which report on the validity of a banking account of the sending party and credit-worthiness of an individual, such as TeleCheck. Further, third party transaction reliability database 103 may correspond to credit reporting services such as Equifax, Experian, Transunion, and the like. Information from third party databases may be sent to transaction reliability information database 102, or directly to one or more agent devices 101a-101n to assist in facilitating reliability determinations.

In some embodiments, decision engine 106 may utilize a scoring system to generate a reliability score. In some embodiments, such a reliability score may exclusively take into account information known to the money transfer agent. Additionally, in some embodiments a generated reliability score may also take into account third party reliability information. Moreover, while some third party reliability information may be taken into account, some embodiments may authorize transactions without the use of information from standard credit reporting agencies.

Some embodiments may utilize third party financial institution 107 to complete the money transfer transaction. Third party financial institution 107 may include any type of institution such as a credit card companies, banks, payday lending institutions, and the like. In such embodiments, when system 100 is in use and a customer is establishing a money transfer transaction, financial institution 107 may create a loan to fund the money transfer transaction as part of an overall money transfer transaction. Third party financial institution 107 may utilize information from reliability server 102, third party reliability server, resources available to financial institution 107, or a combination of the above in order to make reliability determinations. Using this information, financial institution 107 may provide an approval for the money transfer transaction, or an approval up to a specified amount.

As such, in the context of a single money transfer transaction, a user may establish a payment mechanism without having to maintain separate transactions and separate agreements. It is noted that example embodiments a customer may not have any preexisting relationship with third party financial institution 107 and financial institution 107 may utilize the transaction information provided to a money transfer service to establish such a relationship. Additionally, it is noted that financial institution 107 may serve merely as an underwriter for the transaction, and a customer's obligation to pay for the money transfer transaction will be to the money transfer service and not to financial institution 107. Accordingly, embodiments may enable large interest charges to be avoided such as are typical of payday-style lenders. In general, the money transfer service will collect a fee for the money transfer transaction such as is done in the normal course of money transfer transactions. Such fees may vary based on transaction specifics (e.g., details regarding reliability, amounts, prior history, etc.).

In some embodiments, financial institution 107 may correspond to an entity having a loyalty/reward program. Such a program may be utilized to provide reliability information for the transaction. Further, in some embodiments, rewards from a loyalty program belonging to a third party may be utilized to fund the money transfer transaction in whole or in part.

User devices 104a-104n may be any type of device which would facilitate the exchange of information within system 100. For example, client devices may include computer systems, tablet devices, mobile telephones, and the like. Different embodiments may utilize different aspects of the types of client devices. For example, mobile telephones and tablet devices may have the ability to connect with various communications networks and may have different application execution capabilities. User devices 104a-104n may be utilized before, during and after a money transfer transaction in any manner to facilitate convenient and secure transactions.

For example, a user device 104 may be utilized to initiate a transaction and to begin the process of compiling reliability information corresponding to a sender. The initial information may be sent to an agent location to facilitate an expedient transaction. Further, in some embodiments, applications executed on user devices 104a-104n may initiate the described money transactions and send the funds with the assistance of one or more of transaction reliability information database 102 or an agent device 101.

Further, a user device 104 may be utilized to provide transaction information to a sender or receiver. For example, once a money transfer transaction is initiated, a transaction code may be sent to the sender or receiving party. In the event that the transaction code is sent to the sender, the sender may convey that code to the receiver. Such a transaction code may be utilized by the receiving party to initiate the receipt of the money transfer transaction in order to complete the transaction.

Figure 2:
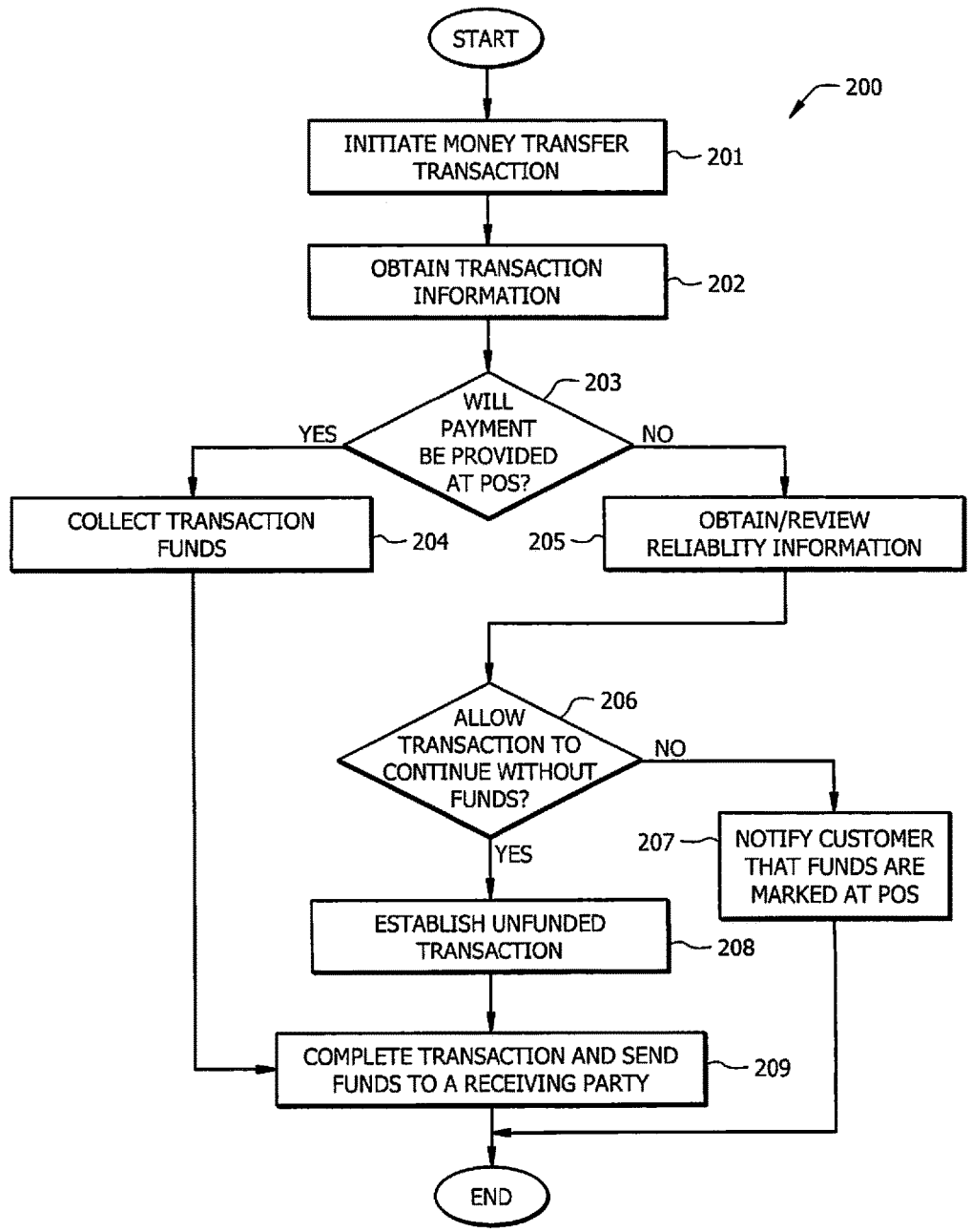
FIG. 2 illustrates a flowchart of a method for facilitating a money transfer transaction in accordance with an embodiment of the present application.

FIG. 2 illustrates a flowchart of a method 200 for facilitating a money transfer transaction in accordance with an embodiment of the present application. Method 200 may be implemented within a system such as system 100 or any other suitable system. Additionally, while method 200 is set forth in steps, it is noted that nothing in this application necessarily limits the order in which the illustrated steps are implemented. In fact, some steps may be implemented in different orders, simultaneously, at multiple points in time, or not at all.

Method 200 begins by initiating a money transfer transaction at block 201. Such a money transfer transaction may be initiated by customer using a personal computing device, visiting a money transfer service location in person and using an on-site device or an agent, etc. The money transfer service obtains transaction information at block 202. Transaction information may originate from a user and include identifying information for the user, destination information for the money transfer transaction, and the like. Additionally, in some embodiments transaction information may be retrieved from a customer database which maintains information about a particular customer such as personal information and transaction history information. The customer database may be linked to a customer loyalty database which maintains such information and administers a loyalty program.

Decision block 203 analyzes whether payment will be provided for the money transfer transaction at the point-of-sale. In the event that payment will be provided, money transfer service collects transaction funds at block 204. After obtaining the funds, the transaction is completed wherein the funds are sent to a receiving party at block 209.

In the event that payment will not be provided at the point-of-sale, reliability information for the customer will be compiled and reviewed at block 205. As noted above, reliability information may be compiled within the money transfer service organization, by using a third-party service, or combination of multiple information gathering resources. Such reliability information may include anything that is probative of the ability of the customer initiating the money transfer transaction to provide payment for the transaction at a later point in time. For example, prior history of the user, information regarding the amount of the money transfer, information regarding the destination of the money transfer, etc., could be utilized.

Upon obtaining and reviewing the reliability information at block 205, a determination is made whether to allow the money transfer transaction to continue without receiving funds for the transaction at the point-of-sale at block 206. This determination may comprise a straight approval or denial for the transaction or may comprise providing a maximum amount which may be transferred without providing funds. In the event that additional funds are needed or that a denial of the transaction is presented, the customer is notified that funds are needed at the point-of-sale at block 207.

In the event that a transaction may be fully or partially unfunded at the point-of-sale, an unfunded transaction is established at block 208. When establishing an unfunded transaction, embodiments may utilize a multitude of future payment options. For example, the money transfer service may require payment to be provided, along with a transaction fee, at a specified point in time. Additionally, the money transfer service may set up a payment plan wherein multiple payments are provided at a later point in time. Establishing an unfunded transaction may also comprise utilizing a third party financial institution to either administer the payment for the money transfer transaction or to underwrite the transaction and work in conjunction with the money transfer service. In one embodiment, the third-party financial institution may be a payday lender which uses similar methods to make determinations regarding the advisability of a transaction which are utilized in the normal course of a payday lending business. Moreover, in some embodiments establishing an unfunded transaction may include establishing known repayment techniques. For example the unfunded transaction may retrieve banking information from a customer and set up an automated clearing house (ACH) payment to be withdrawn as specified point in time from the customer. It is noted that the type of transaction and later payment which is established may be implemented in any manner which accomplishes the concepts set forth in the present application.

Further, in some embodiments the type of unfunded transaction which is established may also have bearing on the amount of fees charged for the money transfer. For example, in instances when a customer is willing to establish an ACH payment method, such transactions are marginally more secure for the money transfer service. As such, the money transfer service may determine to charge a lower transaction fee for such an unfunded transaction.

With the establishment of the unfunded transaction being completed, method 200 may then complete the money transfer transaction and send funds to a receiving party at step 209. Such a completed transaction may utilize normal techniques known to money transfer services. For example, a sender may transmit a transaction code to receiver for later use in receiving the money transfer funds, etc.

Figure 3:
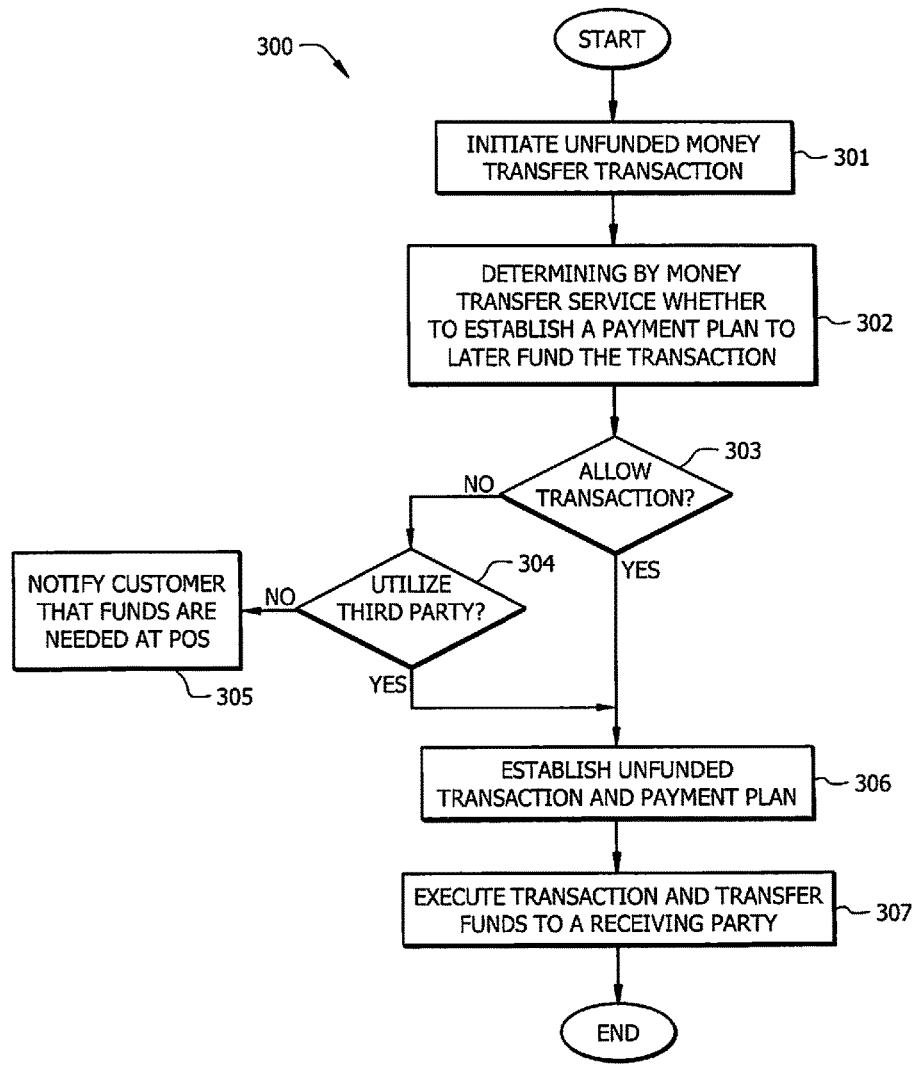
FIG. 3 illustrates a flowchart of a method for facilitating a money transfer transaction in accordance with another embodiment of the present application.

FIG. 3 illustrates a flowchart of a method 300 for facilitating a money transfer transaction in accordance with an embodiment of the present application. As was the case with respect to the flowchart of FIG. 2, method 300 may be implemented within a system such as system 100 or any other suitable system. Additionally, while method 300 is set forth in steps, it is noted that nothing in this application necessarily limits the order in which the illustrated steps are implemented. In fact, some steps may be implemented in different order, simultaneously, at multiple points in time, or not at all.

Method 300 begins with initiating an unfunded money transfer transaction at block 301. As stated above, this initiation may include receiving and compiling information regarding the transaction, the sending party, and the like. With the transaction information, a determination is made by the money transfer service whether to establish a payment plan in order to fund the transaction at a later point in time at block 302.

In some embodiments, when making the determination as to whether to allow the transaction 303 the money transfer service may also make a determination as to whether a third-party service should be utilized to establish such a payment plan at block 304. In a circumstance where the money transfer service and/or a third party service is unwilling to underwrite an unfunded transaction and to accept payment at a later date the customer is notified that funds are needed at the point-of-sale in order to generate the requested money transfer transaction at block 305.

When a determination is made that the customer initiating the unfunded money transfer transaction is authorized to make such a transaction (either by the money transfer service or by the third party service), an unfunded transaction and payment plan is established at block 306. Such a payment plan and unfunded transaction may be implemented as described above. For example, the transaction may allow a user to return to the money transfer service and provide payment at a later point in time, the transaction may allow for an automated withdrawal from a user account, the transaction may provide for multiple payments and a timetable for such payments from the sending party, and the like.

Upon establishing the unfunded transaction and payment plan, method 300 may execute the money transfer transaction in transfer funds to a receiving party at block 307. As noted, such a money transfer transaction may be implemented in any manner, such as those currently utilized by money transfer services.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for facilitating a money transfer, said method comprising:

receiving money transfer transaction information from a sending party by a money transfer service at a time of the transaction;

determining whether the money transfer transaction will be unfunded at the time of the transaction, wherein the money transfer transaction being unfunded includes transferring funds from the sending party to a receiving party prior to the money transfer service receiving the funds from the sending party;

compiling, by at least one processing device, reliability data with respect to the sending party from the money transfer service and a third party reliability server, the reliability data including data probative of the ability of the sending party to provide funding for the transaction at a time later than the time of the transaction;

wherein the reliability data from the money transfer service comprises data from a loyalty account of the sending party maintained by a database of the money transfer service, the data from the loyalty account comprising at least information relating to previous money transfer activities of the sending party;

determining, by said at least one processing device, based on the compiled reliability data, whether the sending party is eligible to establish an unfunded money transfer transaction, the unfunded money transaction being a transaction without funding being received prior to transferring the funds in the transaction;

providing, by said at least one processing device, an indication to an agent device indicating that the sending party is eligible to establish an unfunded money transfer transaction; and sending, by the agent device, based on the indication, funds to the receiving party pursuant to the money transfer transaction without receiving the funds from the sending party at the time of the transaction.

2. The method of claim 1 wherein transaction reliability information is provided by a third party.

3. The method of claim 2 wherein the approval includes a maximum amount of money that may be utilized in the transaction.

4. The method of claim 1 further comprising receiving funds for the money transfer by the money transfer service at a later point in time, wherein the amount of funds received equals the amount of money transferred plus a transaction fee.

5. The method of claim 1 further comprising establishing a lending relationship with a third party financial institution at the time of the money transfer transaction.

6. The method of claim 5 wherein payment is provided to the money transfer service in order to pay for the money transfer service transaction.

7. A method for facilitating a money transfer transaction, said method comprising:
receiving money transfer transaction information from a sending party by a money transfer service;
initiating a money transfer transaction by the money transfer service;
obtaining transaction information regarding a sending party, transaction amount, and receiving party;
determining whether payment for the money transfer transaction will be provided at a point-of-sale;
compiling, by a processing device, reliability information for the transaction to determine whether to establish an unfunded money transfer transaction, wherein the unfunded money transaction includes transferring funds from the sending party to the receiving party prior to the money transfer service receiving the funds being transferred from the sending party;
determining, by the processing device, based on the compiled reliability information, whether the sending party is eligible to establish an unfunded money transfer transaction;
providing, by the processing device, an indication to an agent device indicating that the sending party is eligible to establish an unfunded money transfer transaction; and
sending, based on the eligibility determination, funds to the receiving party without receiving the funds from the sending party at the time of the transaction;
wherein the reliability information comprises data probative of the ability of the sending party to provide funding for the transaction at a time later than the time of the transaction, which includes data from a transaction database that maintains an accounting of previous transactions sent by a sending party, including whether payment has been made for previous transactions.

8. The method of claim 7 further comprising sending the funds to a receiving party.

9. The method of claim 7 further comprising establishing a payment plan for the money transfer transaction and receiving authorization to deduct an automated clearing house payment from an account associated with a sending party at a later point in time.

10. The method of claim 9 further comprising utilizing a third party to assist in establishing said payment plan.

11. The method of claim 7 wherein establishing a payment plan for the money transfer transaction includes arranging for a payment schedule for multiple payments to be made by a sending party at different points in time.

12. The method of claim 7 further comprising collecting a fee for the money transfer transaction.

13. The method of claim 12 wherein the fee is collected at the point-of-sale.

14. The method of claim 12 wherein the fee is collected along with one or more payments associated with an established payment plan.

15. The method of claim 12 wherein the fee amount is determined based on the type of payment plan established.

16. The method of claim 7 further comprising utilizing a third party to provide reliability information for the sending party.

17. A method comprising:
receiving money transfer transaction information from a sending party by a money transfer service;
compiling, by at least one processing device, reliability data with respect to the sending party from the money transfer service and a third party reliability server, the reliability data including data probative of the ability of the sending party to provide funding for the transaction at a time later than the time of the transaction;
determining, at a processing device, whether a money transfer transaction will be unfunded at the time of the transaction, wherein the money transfer transaction being unfunded includes transferring funds from the sending party to a receiving party prior to the money transfer service receiving the funds from the sending party, said determining implemented at least in part by analyzing the compiled reliability data from transaction database that maintains an accounting of previous transactions sent by a sending party;
initiating an unfunded money transfer transaction based on the determining, wherein the unfunded money transfer transaction includes transferring funds from the sending party to a receiving party prior to the money transfer service receiving the funds being transferred from the sending party; and
executing the money transfer transaction prior to receiving the funds from the sending party.

18. The method of claim 17 wherein said determining step utilizes a third party service to obtain information regarding the sending party.

19. The method of claim 17 wherein said determining step utilizes a third-party service to underwrite the unfunded transaction.

20. The method of claim 17 wherein said determining step provides a determination to establish a money transfer transaction for an amount less than the requested transfer amount.

21. The method of claim 17 further comprising collecting a transaction fee for the money transfer transaction.

* * * * *